SCREW COUPLING.
(Application filed Jan. 4, 1900.)
(No Model.)
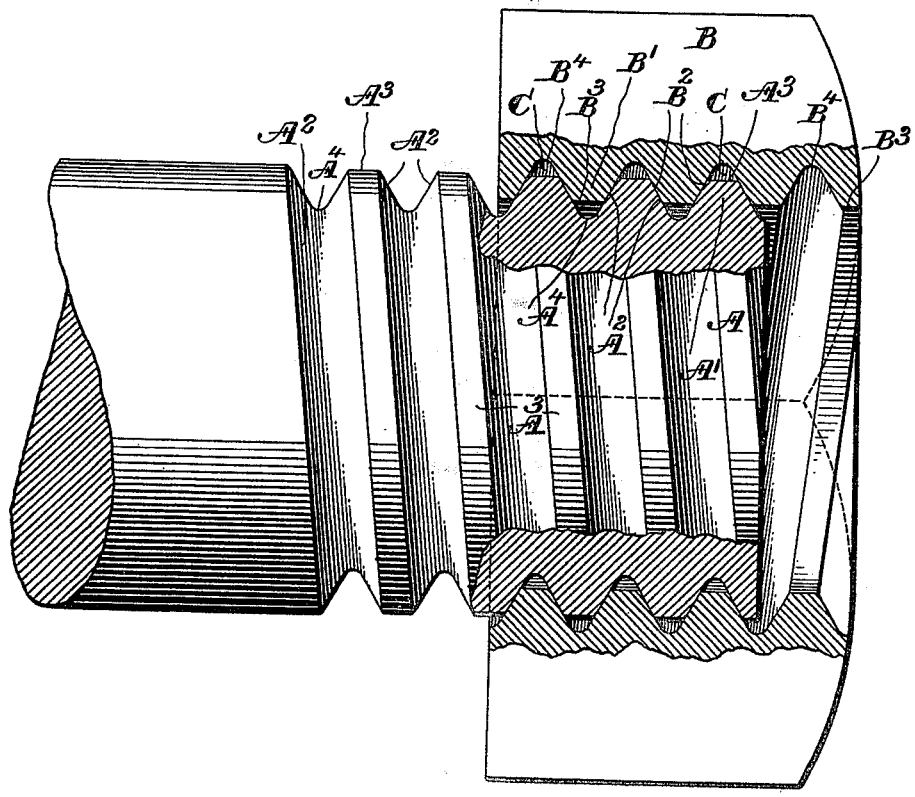

UNITED STATES PATENT OFFICE.

CLINTON A. HIGBEE, OF PHILADELPHIA, PENNSYLVANIA.

SCREW-COUPLING.

SPECIFICATION forming part of Letters Patent No. 658,085, dated September 18, 1900.

Application filed January 4, 1900. Serial No. 321. (No model.)

*To all whom it may concern:*

Be it known that I, CLINTON A. HIGBEE, a citizen of the United States of America, residing in the city and county of Philadelphia, in the State of Pennsylvania, have invented a certain new and Improved Screw-Coupling, of which the following is a true and exact description, reference being had to the accompanying drawings, which form a part thereof.

My invention relates to the construction of screw-couplings of any and all kinds where the threads of the screws are formed on cylindrical surfaces as distinguished from conical surfaces.

The object of my invention is to provide a screw union or coupling in which a more perfect fit can be secured and maintained between the coupled members, and I accomplish this by forming the threads of the male and female members of the usual angular sectional outline, except that I so form the tops and bottoms of the threads as to afford an entire clearance between the tops of the threads and the bottoms of the other threads with which they are engaged. Preferably I so form the threads of each member that they do not merge into each other at the bottom, and, of course, the tops of the threads being truncated in such a way as not to fit closely into the bottom of the coupled threads, the distance between the sides of the threads at the top is greater than the distance between the sides of adjacent threads at the bottom.

Reference being had to the drawings which illustrate my invention, A indicates the male member, and B the female member, of the screw-coupling.

A' is the thread of the male coupling, and B' the thread of the female coupling.

$A^2$ and $B^2$ indicate the sides of the threads, which fit neatly together, as shown.

$A^3$ and $B^3$ indicate the truncated tops of the threads, and $A^4$ and $B^4$ the bottoms of the threads, which are preferably of the conformation shown.

C C, &c., indicate the clearances between the tops and bottoms of the coupled threads.

In my former patent, No. 597,000, dated January 11, 1898, the threads, like the threads of my present invention, are so truncated or cut away at the tops that they do not conform to and fit into the bottoms of the threads with which they are coupled; but in my said former invention the threads having the peculiarity of shape described are one or both formed on conical surfaces, and the purpose of my said invention was to secure a tight screw-joint by the flow of the metal of the tops of the threads into the interstices left at the bottoms of the threads when the two members are coupled together.

In my present invention the threads having the peculiarity of shape described are formed on cylindrical surfaces and are not therefore exposed to the forces which in my former invention caused the flow of the metal.

The great utility of my present invention lies in the fact that it enables me to secure a screw-coupling which under practical conditions is a better and a more accurately fitting coupling than has been or can be obtained by previous methods of construction in which it is sought to make the threads fit neatly and closely together from top to bottom.

The reason why my improved coupling is a better and more accurate one than the couplings heretofore constructed is that the members of all such couplings are made by the use of taps and dies, which taps and dies wear quite rapidly at the points or tops of their threads. The result of such wear is to cause an interference between the tops and bottoms of the threads formed by the worn tools, because any such wear on the tap and die threads results in making the bottoms of the threads cut by it shallower or closer to the tops of the threads than it should be, while any wear on the bottom of the thread in the tools results in making the tops of the threads cut by them higher than they are designed to be. Consequently tools which when first made are of perfect form and will form bolts and nuts fitting accurately upon each other will in a short time and as soon as wear begins form bolts and nuts in which the tops of the threads interfere with the bottoms of the coupled threads. When this inevitable result of wear occurs, it is customary in shops to try to compensate for it by changing the form of the taps and dies. This, however, at once destroys the identity of the form between the sides of the male and female threads, compensating for one defect at the expense of incurring a still more deleterious one.

It will be readily seen that by my device, in which an entire clearance is made between the tops and bottoms of the coupled threads, I entirely avoid the defects noted as to the usual practice and am enabled to produce screw-coupling members which can be relied upon for accurate and close fit.

While it is the points of the cutting-tool threads which wear most rapidly, wear also occurs on the sides of the threads and results in increasing the thickness of the threads cut by the tools. This in the ordinary threads causes the male and female members to jam. In my new thread this increase of the breadth of the threads is not troublesome, as the clearance between the tops and bottoms of the threads in the coupling permits the metal of the threads to flow outward and results simply in a better fit between the threads than it is possible to provide for by any care in making the thread-cutting tools. It is also obvious, of course, that my construction is such as to leave in the coupling when united a spiral channel running from one end to the other. Unless means are provided for closing this channel it will naturally afford a means of leakage through the coupling. The presence of this channel does not, however, in any material degree weaken the strength of the coupling.

In speaking of the threads as being formed on cylindrical or conical surfaces I do not intend to limit myself to exact mathematical forms, but simply to distinguish between the familiar form of screw-couplings in which the members run freely on each other and the other familiar form in which the members jam or bind as they are screwed together.

Having now described my invention, what I claim as new, and desire to secure by Letters Patent, is—

1. A screw-coupling having V-shaped threads of the male and female portions formed on cylindrical surfaces and with tapered sides adapted to make a close fit with each other and their tops and bottoms so formed as to leave a substantial clearance between the tops and bottoms of the coupled threads both in the male and female portions of the coupling.

2. A screw-coupling, each member of which has truncated V-shaped threads formed on cylindrical surfaces and not merging into each other at the bottom and in which the distance between the sides of the threads is greater at their tops than is the distance between the sides of adjacent threads at the bottom, the tapered sides of the threads being formed to fit closely together and the tops and bottoms to clear each other when the members are coupled.

CLINTON A. HIGBEE.

Witnesses:
CHAS. F. MYERS,
D. STEWART.